(12) United States Patent
Heim et al.

(10) Patent No.: US 9,971,442 B2
(45) Date of Patent: May 15, 2018

(54) HUMAN INTERFACE DEVICE AND METHOD (71) Applicant: MICROCHIP TECHNOLOGY GERMANY GMBH, Rosenheim (DE)

(72) Inventors: Axel Heim, Munich (DE); Joao Ferreira, Gilching (DE)

(73) Assignee: MICROCHIP TECHNOLOGY GERMANY GMBH, Rosenheim (DE)

( * ) Notice: Subject to any disclaimer, the term of this patent is extended or adjusted under 35 U.S.C. 154(b) by 45 days.

(21) Appl. No.: 14/924,329

(22) Filed: Oct. 27, 2015

(65) Prior Publication Data

US 2016/0124568 A1    May 5, 2016

Related U.S. Application Data (60) Provisional application No. 62/072,184, filed on Oct. 29, 2014.

(51) Int. Cl.
G06F 3/045    (2006.01)
G06F 3/041    (2006.01)
G06F 3/044    (2006.01)
G06F 3/01    (2006.01)
G06F 3/0488    (2013.01)

(52) U.S. Cl.
CPC ............ *G06F 3/0416* (2013.01); *G06F 3/017* (2013.01); *G06F 3/044* (2013.01); *G06F 3/04883* (2013.01)

(58) Field of Classification Search
CPC ........ G06F 3/017; G06F 3/0416; G06F 3/044; G06F 3/04883
See application file for complete search history.

(56) References Cited

U.S. PATENT DOCUMENTS

| 8,330,731 | B2 | 12/2012 | Ausbeck, Jr. ................. 345/173 |
| 2011/0205175 | A1 | 8/2011 | Chen .............................. 345/172 |
| 2014/0253482 | A1* | 9/2014 | Toyoura ............... G06F 3/0418 345/173 |
| 2015/0097809 | A1* | 4/2015 | Heim .................... G06F 3/0416 345/174 |
| 2015/0378504 | A1 | 12/2015 | Hayasaka et al. |

FOREIGN PATENT DOCUMENTS

WO    2014/132893 A1    9/2014    ............. G06F 3/041

OTHER PUBLICATIONS

International Search Report and Written Opinion, Application No. PCT/EP2015/075040, 11 pages, dated Jan. 29, 2016.

* cited by examiner

*Primary Examiner* — Insa Sadio
(74) *Attorney, Agent, or Firm* — Slayden Grubert Beard PLLC

(57) ABSTRACT

A method for detecting a continuous circular gesture performed by an object, may have the steps of: detecting a movement of an object performing a circular movement by scanning the movement and determining subsequent position points of the object, wherein a reference position of a virtual circular movement is adapted depending on the history of scanned position points.

26 Claims, 7 Drawing Sheets

HUMAN INTERFACE DEVICE AND METHOD

RELATED PATENT APPLICATION

This application claims priority to commonly owned U.S. Provisional Patent Application No. 62/072,184 filed Oct. 29, 2014, which is hereby incorporated by reference herein for all purposes.

TECHNICAL FIELD

The present disclosure relates to a method and device for a human interface, in particular a continuous circular gesture detection method for a sensor system.

BACKGROUND

Known systems for multi-level control, e.g. volume control or screen/light brightness control in consumer electronics products, use circular touch-pads or capacitive linear sliders (frequently mounted above the keyboard in notebooks), or they are using the touch information from a generic notebook touchpad when the finger is moving in a dedicated slider area, for example, on the right border of the touchpad. These sensors provide absolute position information (possibly ambiguous position information as in the case of many circular touch pads) about the finger tip, and hence the finger tip's angle on the circular touchpad or the position on the slider—information that can be mapped directly or differentially to a control level in a straight forward way. In particular for the touch wheel it is important that the fingertip and the wheel's geometric center build an angle with a reference point on the wheel, and this angle can be evaluated.

When it comes to the recognition of circle gestures without fix reference position, determining an angle in the circle movement is no longer straight forward. This is the case, for example, for a generic non-circular touchpad, with two-dimensional/three dimensional (2D/3D) free-air gestures using near-field capacitive sensor systems, or with mid/far field sensor systems like video or infrared camera systems.

Considering a circle or circular movement, which can either be clockwise or counter-clockwise, and not limiting it to have a fix start or stop position, at each time during the circle movement, for real-time application one can only evaluate data acquired up to the presence, i.e. only partial gesture patterns. Without knowing the drawn circle's center, in the beginning of the movement the detection unit cannot tell the direction of the circle: For example, a left-right movement appears in the top of a clockwise circle but also in the bottom of a counter-clockwise circle. A circle gesture is to be understood in this disclosure to mean any type of circular movement. It does not require to have a constant radius but the radius and center point may vary over time as typical for any free movement of a hand or finger describing a circle without having a reference point or a prescribed path to follow.

There are several known methods to map a 2D circular movement onto one-dimensional (1D) data.

Figure 1:
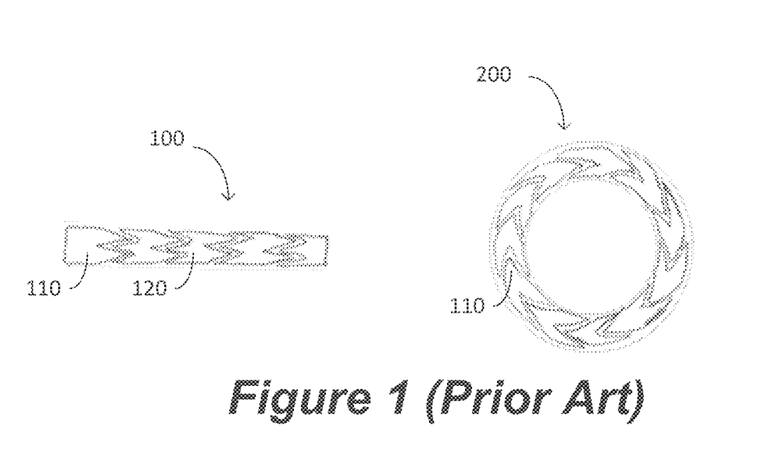
FIG. 1 shows conventional arrangements of electrodes for a capacitive slider in a linear and circular arrangement.

Circular Touch-Pad: A 1D capacitive slider 100, as for example shown in FIG. 1, comprises a plurality of linearly arranged sensor elements 110, 120. Such a sensor can also be arranged in a circle as shown with sensor 200 in FIG. 1, in order to detect circular movement, certain MP3 music players use this technology.

Figure 3:
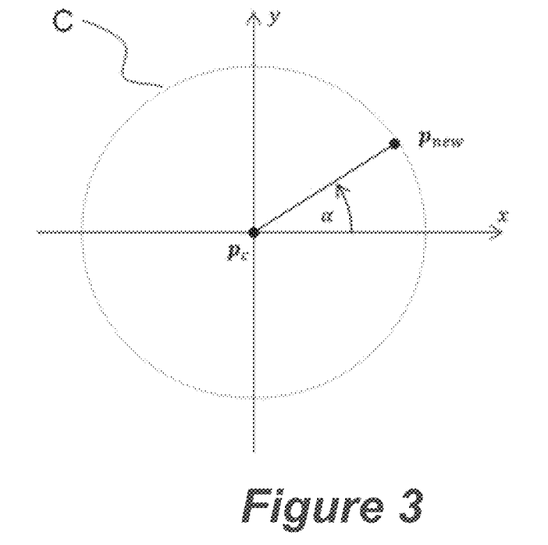
FIG. 3 shows a point on a circle C at an angle α.

Fix Center Position: Any point in 2D Cartesian coordinates can be bijectively mapped to a distance from a fixed reference position (center point) and the angle between a line through this point and the reference position and a reference direction vector, e.g. the direction of the positive x-axis, yielding the point in polar coordinates. Here, the named angle is the desired 1D data. Provided an input position $p_{new}$ on a circle C and a fix center position $p_c$ of C, as shown in FIG. 3, with x and y component of $p_{new}$ being p(new,x) and p(new,y), respectively, the angle $\alpha$ of $p_{new}$ relative to the positive x-axis can be uniquely determined by computing the four quadrant inverse tangent function a tan 2 of vector connecting $p_{new}$ and $p_c$, i.e. $\alpha$=a tan 2(p(new,y)−p(c,y), p(new,x)−p(c,x)). Compared to the single-argument inverse tangent function whose output is periodic with $\pi$, a tan 2 additionally evaluates the signs of p(new,x)−p(c,x) and p(new,y)−p(c,y) and hence can map $\alpha$ to one of the four quadrants. Clearly, this method is not restricted to input positions on a circle, but can take any 2D position as input and will output an angle. Naturally, in addition to this absolute angle output, given two input position vectors $p_{old}$ and $p_{new}$, two output angles can be computed, their difference being a measure for the movement of the input position.

Figure 4:
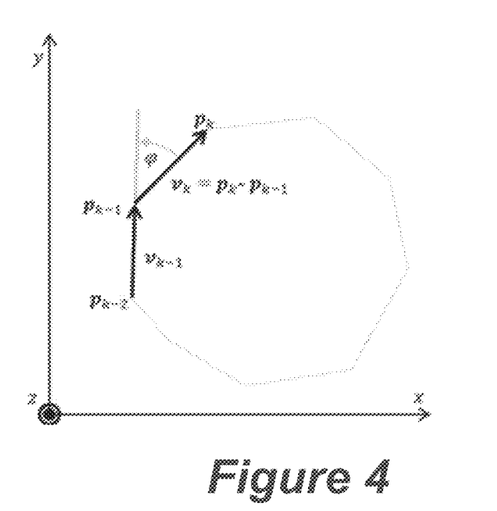
FIG. 4 shows an angle between two successive velocity vectors.
Figure 5:
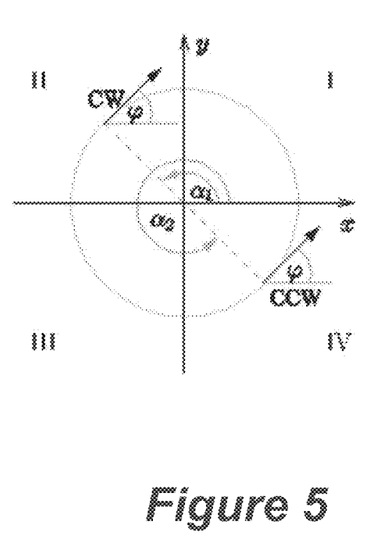
FIG. 5 shows two motion vectors with the same direction being tangent to a circle in a 2D plane.
Figure 6:
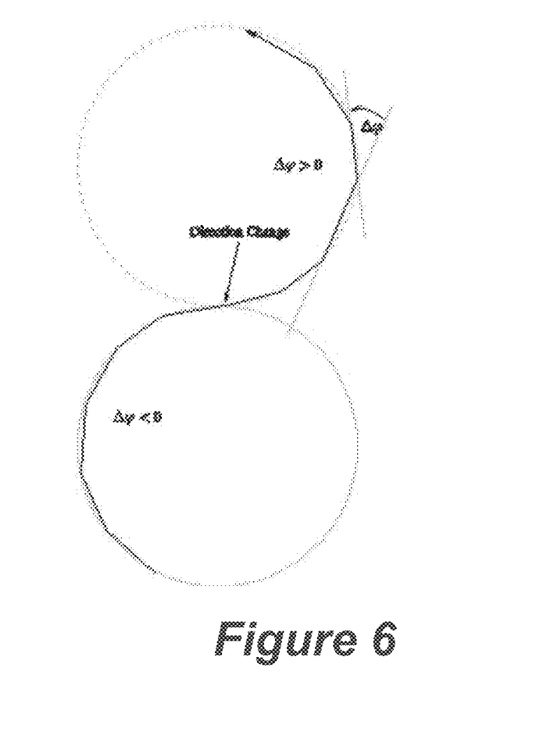
FIG. 6 shows a trajectory of clockwise and counter-clockwise movement in 2D.

According to co-pending U.S. patent application Ser. No. 14/503,883, entitled "Continuous circle gesture detection for a sensor system", filed by Applicant and hereby incorporated by reference in its entirety, a method is proposed where angles (or approximations therefrom) between successive velocity vectors are accumulated over time, hence performing differential updates of an accumulator, where a velocity vector is defined as the difference between two position vectors being successive in time. This is illustrated in FIG. 4. Depending on the rotating direction between an old and a new velocity vector (it is assumed that that amount of rotation is less than $\pi/2$), the 1D accumulator is either increased or decreased. The amount by which the accumulator is changed is the angle between the two velocity vectors or an approximation thereof. This approach is tolerant to translation and scaling, i.e. for example when the 2D input positions are acquired with a touch pad, it does not matter in what area of the touchpad a certain pattern is drawn, e.g. in the bottom left or top right, or how big it is drawn—the effect on the 1D output measure is the same. However, this approach does not provide the angle of a position moving smoothly on a circle. While theoretically it is possible to integrate differential angles between successive velocity vectors, there would still lack the constant of integration. Further, with approximations and filtering/smoothening, a (small) error is introduced at each differential update of the angle estimate which would accumulate as well. Neither can a be computed from the angle of an input velocity vector, as this would be ambiguous mapping, cf. FIG. 5: A velocity vector at angle $\varphi$ to the top right can either origin from a position in quadrant II rotating clockwise—corresponding to angle $\alpha_1$ of this position—or it can origin from a position rotating counter-clockwise in quadrant IV, corresponding to angle $\alpha_2$, where $\alpha_1$ and $\alpha_2$ differ by $\pi$. Even when the rotating direction would be known, e.g. from the history of velocity vectors, a map from $\varphi$ to $\alpha$ would imply jumps by $\pi$ whenever the rotating direction changes—which is certainly not a smooth measure. This is illustrated in FIG. 6 which shows the trajectory of an upward movement, first rotating clockwise and then changing the rotating direction.

According to U.S. Pat. No. 8,330,731, which discloses a "Method and apparatus for initiating one-dimensional signals with a two-dimensional pointing device", the sign of the angle between two successive motion vectors determines the sign/polarity of the (differential) update value of the 1D data. The amount of 2D movement scales the magnitude of the update value. The polarity of the 1D data is changed with delay to the angle sign change, or upon abrupt stop. Start detection: Detection of finger motion within a defined target zone, e.g. right edge of a touchpad. This approach does not provide absolute angle information.

Above solutions provide for a mapping of a 2D (circular) movement to 1D data, but they do not account for an estimate of the absolute angle of the point/finger's position on a virtual circle.

SUMMARY

Therefore, there exists a need for an improved method for mapping a 2D (circular) movement onto 1D data. According to various embodiments, a circular movement of a point in 2D space and the angle of this point relative to the center point of the drawn, virtual circle, can be detected where the absolute position of this center point is unknown.

According to an embodiment, a method for detecting a continuous circular gesture performed by an object, may comprise the steps of: detecting a movement of an object performing a circular movement by scanning the movement and determining subsequent position points of the object, wherein a reference position of a virtual circular movement is adapted depending on the history of scanned position points. According to a further embodiment, the reference position can be a circle center position and the circle center position can be used to determine a current output angle of a circular movement. According to a further embodiment, the current output angle can be determined using an inverse tangent of $(p_{new}-p_c)$, wherein $p_{new}$ is a current position point and $p_c$ is a current circle center position. According to a further embodiment, the position points can be transformed into positions in a two-dimensional plane and extrema of a plurality of subsequent position points are stored in a buffer. According to a further embodiment, the extrema may comprise a set of positions on the trajectory wherein, for each comprised position p, there are two associated velocity vectors, the current velocity vector, starting at p, and the previous velocity vector, ending at p; and an angle of one of the said vectors is greater than or equal to a defined angle where an angle of the other said vector is less than the defined angle, or an angle of one of the said vectors is greater than a defined angle where an angle of the other said vector is less than or equal to the defined angle; and wherein said circle center position is determined from said stored extrema. According to a further embodiment, the extrema may comprise a most left, a most right, a most top and a most bottom position in said two-dimensional plane and wherein said circle center position is determined from said stored extrema. According to a further embodiment, a circular movement can be detected by computing an angle between a current velocity vector and a low passed filtered version of the current velocity vector. According to a further embodiment, the circle center position can be updated when the distance between a new position point and a current center position is smaller than the distance between a previous position point and the center position. According to a further embodiment, updating can be performed by adding a fraction of a distance between a new circle center position and a current circle center position to the current circle center position. According to a further embodiment, updating can be performed by low pass filtering a circle center position change. According to a further embodiment, a current position can be buffered in a buffer and wherein the buffer is only updated when a movement is determined to be part of a circular movement and when a velocity vector is higher than a predetermined velocity threshold. According to a further embodiment, a gesture can be determined between a start event and a stop event. According to a further embodiment, the start event can be defined by a circular trajectory and a predefined threshold angle. According to a further embodiment, a current angle measurement can be accumulated over multiple measurements to determine the start event. According to a further embodiment, the stop event can be determined when no circular movement is detected for a predetermined time period. According to a further embodiment, the stop event can be determined when no movement is detected for a predetermined time period. According to a further embodiment, a circular movement can be determined by analyzing a segmented movement in each quadrant of a circular movement. According to a further embodiment, the method may further comprise using a look-up table storing pre-computed threshold values for segments of a quarter of a circular movement. According to a further embodiment, the object can be a finger, a hand, or a pen. According to a further embodiment, scanning the movement and determining subsequent position points of the object can be performed by a sensor system generating a quasi-static electric field through a transmission electrode and wherein the sensor system comprises at least two receiving electrodes.

According to another embodiment, a method for detecting a continuous circular gesture performed by an object may comprise: detecting a movement of an object performing a circular movement by scanning the movement and determining subsequent position points of the object, detecting a decrease of a radius of a circular movement, wherein the decrease of the radius is detected when a sector line of a velocity vector between two successive position points intersects with a line through a center point and an older position point of the two position points; updating a center point when a decrease of the radius has been detected.

According to a further embodiment, updating can be performed by adding a fraction of a distance between an intersection point and the center point to the center point. According to a further embodiment, updating can be performed by low pass filtering a center point change. According to a further embodiment, the sector line can be a perpendicular bisector of the line between new and old position. According to a further embodiment, the sector line may have an angle unequal 90 degrees with respect to the velocity vector. According to a further embodiment, two different lines can be considered, for clockwise and counterclockwise movement. According to a further embodiment, the method may further comprise outputting an angle of a position point relative to the reference position of the virtual circular movement.

According to yet another embodiment, in a method for detecting a continuous circular gesture, a center position of a virtual circular movement can be adapted depending on local/global extrema in the coordinates along the trajectory.

DETAILED DESCRIPTION

A circular gesture (rotational finger movement, hereinafter also called "AirWheel") can be used in a gesture detection system to control a variety of different parameter, e.g. volume or light dimming control, etc. However, movements in a non-touching system are often not consistent and may be difficult to detect which can often lead to a bad user experience. The various embodiments of detection methods disclosed in this application are designed to overcome this possible disadvantage.

Figure 15:
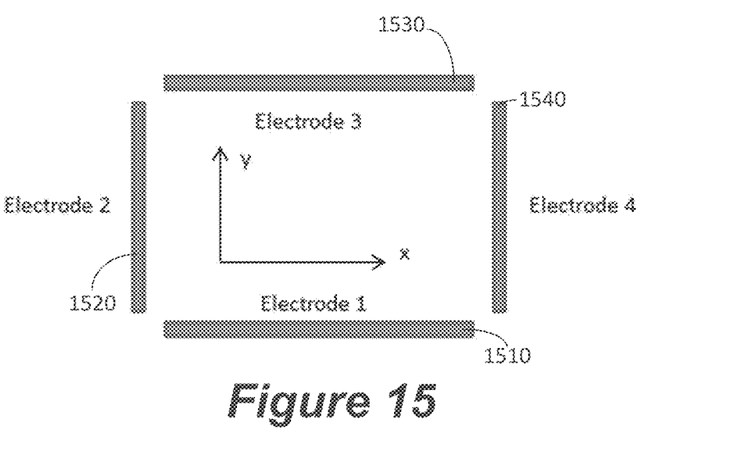
FIG. 15 shows a gesture detection electrode layout with four frame receiving electrodes using a quasi-static electric field detection method.

The disclosed methods are not limited to any type of user input device. Thus, it may apply to any 2D or 3D detection system. A non-touching gesture detection system is shown in FIG. 15. Such a three-dimensional gesture detection systems uses a quasi-static alternating electric field with a 4-frame receiving electrode layout. A transmitting electrode (not shown) may be, for example arranged under these four electrodes 1510, 1520, 1530, and 1540 and cover the entire area of or encircled by the receiving electrodes 1510, 1520, 1530, and 1540. Other arrangements may be used. The velocity vectors $v_k$ as shown in FIG. 4 may be determined by measurement values from the receiving electrodes 1510, 1520, 1530, and 1540, which increase (or decrease—depending on the measurement system) with decreasing finger-to-electrode distance. In such a system, generally a transmission electrode (not shown) is used to generate an electric field, for example using a 30-200 kHz square wave signal generated by a microcontroller port, and the plurality of receiving electrodes 1510, 1520, 1530, and 1540 which detect a disturbance in the field when an object enters the quasi-static electric field. The signals from the receiving electrodes are fed to an evaluation device which is configured to determine a three-dimensional position from these signals. The transmission signal for generating the quasi static field is typically continuously fed to the transmitting electrode during a measurement, contrary to capacitive touch measurements which typically may use pulses. The method discussed herein may be particularly beneficial in such a three-dimensional non-touch gesture detection system. Further, gesture detection samples where the data from all electrodes 1510, 1520, 1530, and 1540 have the same sign, i.e. the finger is approaching/leaving all electrodes, may be ignored for updating the circle counter. However, as mentioned above, the method may apply to various other two- or three dimensional gesture detection systems.

A gesture detection system determines a movement of an object, for example a finger between a start and stop event. For purposes of detecting a circular movement of the object, during the start and stop event a plurality of position measurement may be made and the positions may be converted into x-y coordinates of a two-dimensional coordinate system even if the system is capable of detecting three-dimensional positions. The sampling time may be preferably 200 samples per second and the system can determine vector values from the determined position values and from the associated sampling times.

Figure 2:
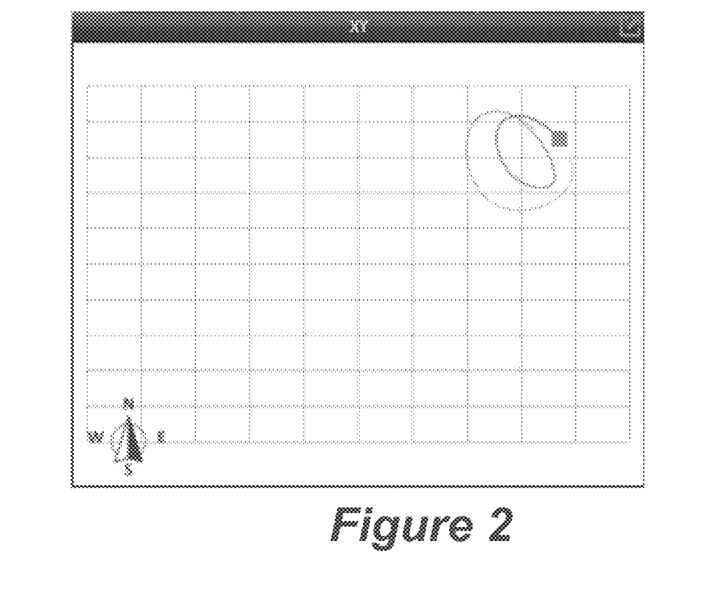
FIG. 2 shows a trace of a 2D position estimate for circular hand movement in front of a near field gesture detection system.

FIG. 2 shows a trace of a 2D position estimate for circular hand movement in front of a near field gesture detection using an electrode arrangement as shown in FIG. 15. FIG. 2 shows the trace of a 2D position estimate of a circular finger movement in front of a near-field gesture detection system in x- and y-direction. In this figure, the positions are shown in the top right part of the detection area. However, depending on the hand posture, the estimated position may also lie in another part of the detection area, e.g. in the bottom left, or the size of the detected trace is larger or smaller depending on an individual's shape of finger or hand. However, independent of the hand posture, this movement shall still be detected as circular movement. Another reason for different positioning results can be that a default parameter set is used for a multitude of sensors, e.g. differing in size, and there shall be no need for the customer to re-parameterize the system, but functionality shall be provided out-of-the-box.

An example for the need of absolute angle information for visualization purposes is the following: A circular movement of a touching finger on the translucent cover plate of a light switch shall illuminate one LED of a set of LEDs arranged in a circle underneath the cover, whereas the lightened LED shall be the one placed at the position or at the angle corresponding to the finger's current position, i.e. the illumination follows the finger's position on a virtual circle.

Summarizing, tolerance to different hand postures or to scaling and translation of the circle gesture, as well as robustness to inaccurate parameterization—while providing a means of absolute angle information—makes the main motivation for the subject matter claimed in this application.

According to various embodiments, a circular movement can be detected by evaluating the rotating direction of input positions, and a virtual circle center is updated depending on the history of input positions, serving as a reference for output angle computation.

Computation of Output Angle

The computation of the output angle is straight forward: For each new input position $$p_{new} = \begin{bmatrix} p_{new}, x \\ p_{new}, y \end{bmatrix},$$

the angle $\alpha$ between the vector from the current virtual center point $p_c$ to $p_{new}$ and the positive x-axis is returned. It is obtained, for example, by computing the four-quadrant inverse tangent of ($p_{new}$−$p_c$). This output angle may be further filtered, e.g. in order to reduce jitter.

Update of Center Position

The core of this disclosure is to update a virtual circle's center position—relative to which an angle of a position is computed—depending on the input positions' history. Two approaches are proposed.

Figure 9:
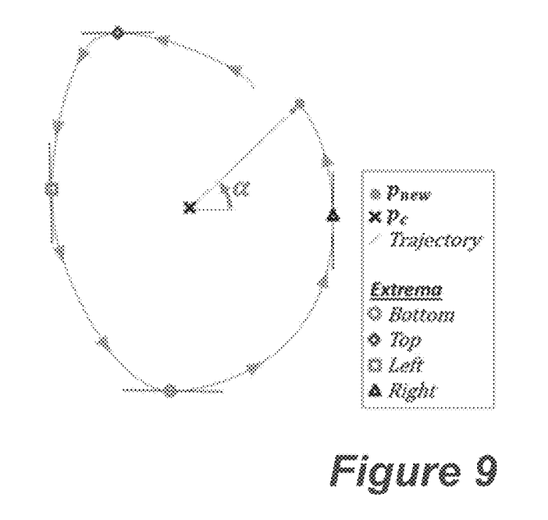
FIG. 9 shows a virtual center position update, four extreme points and measured angle.

Approach A:

The center position is updated by combining several characteristic positions along a circular trajectory, e.g. by averaging). These positions are stored in a buffer where each of the buffer entries corresponds to a specific characteristic position along the circular trajectory. A possible set of characteristic positions are the local extrema in X or Y coordinates, as shown in FIG. 9. Each time a characteristic position is detected, first the corresponding entry in the buffer is updated with this position and then the center position. This is illustrated in FIG. 9.

The characteristic positions (hereinafter also called extrema) are found by computing the current velocity vector $v_{new}=p_{new}-p_{old}$, and the previous velocity vector $v_{old}$, where $p_{old}$ is the previous input position. If the angle of $v_{new}$ takes or exceeds (is below) a defined angle and the angle of $v_{old}$ is below (exceeds) the same defined angle, $p_{old}$ is considered to be a characteristic position, it is stored in its corresponding entry in the buffer and the center position $p_c$ is updated. A list of defined angles determines the list of characteristic positions used to compute $p_c$.

Figure 10:
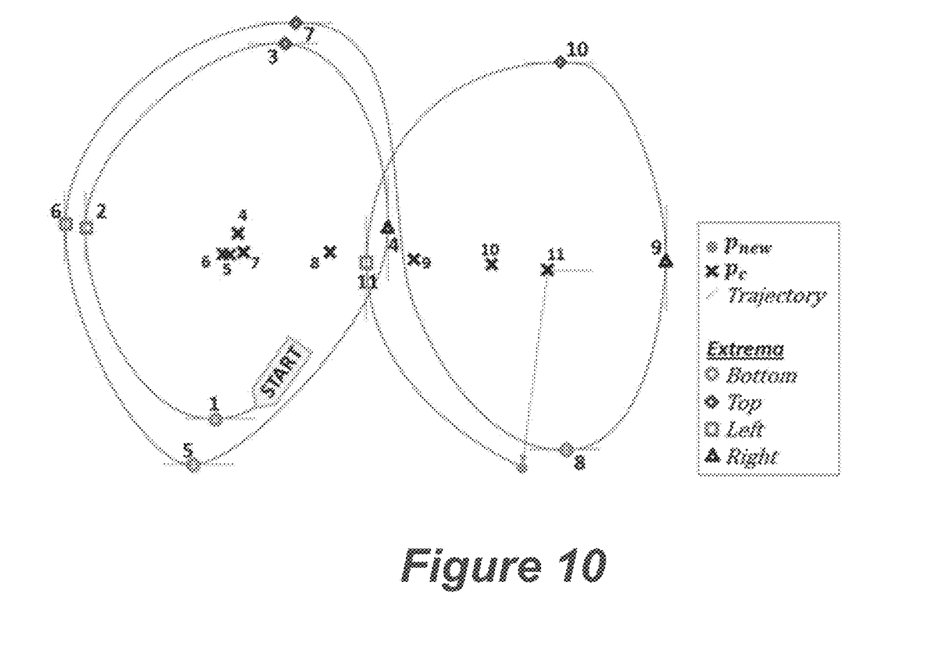
FIG. 10 shows a virtual center update example, with four extrema.

The extrema may be updated during each full circle movement performed by an object such as a finger or a hand. Thus, the value of the new extremum can be both, larger or smaller FIG. 10 illustrates this process, with four extrema, for a trajectory where the virtual center point changes position and the rotation changes direction, starting with clockwise rotation. The numbering indicates the time instances in the sequence where the extrema positions are detected and stored in the buffer and in which $p_c$ is updated. The crosses indicate the changing position of the circle center position. As can be seen, the most left position changes from point 2 to point 6 to point 11. The most top position changes from point 3 to point 7 to point 10. The most right position changes from point 4 to point 9 and the most bottom position from point 1 to point 5 to point 8.

In fact, there are additional conditions for updating the position buffer and the center position: The update does only take place at the named time instances if a new input position $p_{new}$ is classified as being part of a circular movement and if the velocity $\|v_{new}\|$ is high enough, e.g. higher than a threshold.

Figure 11:
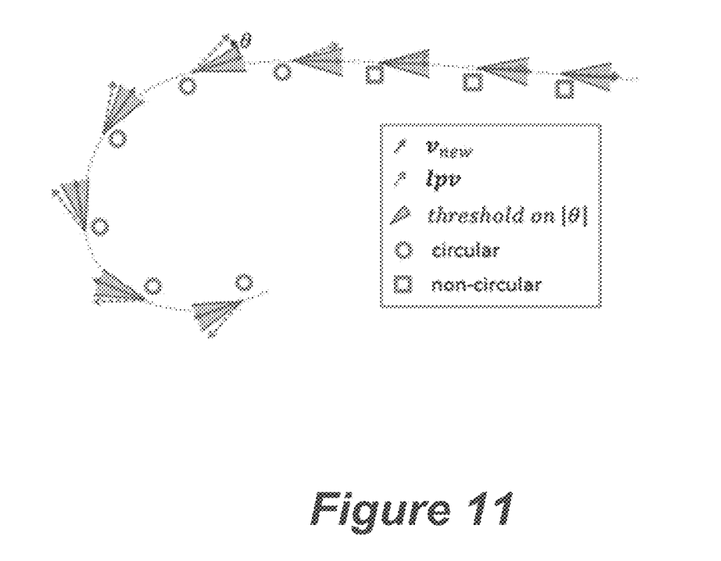
FIG. 11 shows a circular movement classification.

Classification of circular movement is done for every input position by computing the angle Θ between the current velocity vector $v_{new}$ and its low passed filtered version $1pv=1pf(v_{old})$. In circular movement, the angle of $v_{new}$ is continuously changing and due to the filtering delay, there is an angular difference between the two vectors. If the movement is non-circular, but rather linear, the direction of $v_{new}$ hardly changes over time and |Θ| is typically small. |Θ| can be used as a continuous measure of the likelihood that the sample belongs to a circular movement or it can be compared with a fixed threshold for binary classification. FIG. 11 illustrates an example of the circular classification process where the trajectory is changing from a circular to, for example, linear and where the decrease of the angular separation between $v_{new}$ and $1pv$ is visible.

Optional Refinement

Figure 13:
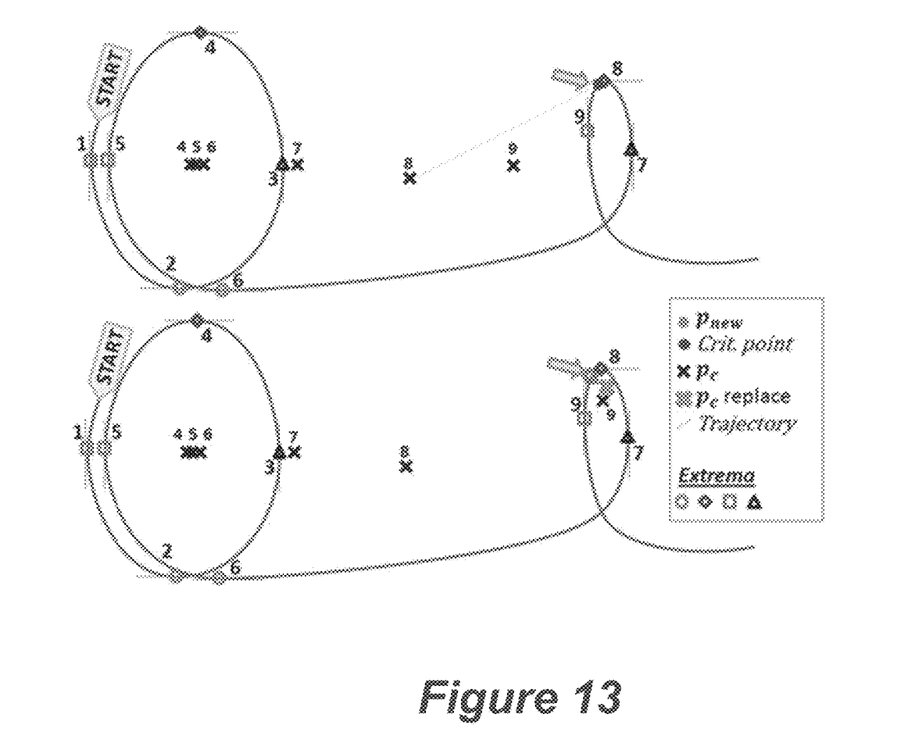
FIG. 13 shows an erroneous center estimation on the top which creates a false direction change after point 8 and a direction validation on the bottom which detects the wrong direction inversion in the critical point and replaces two extrema in the buffer thereby correcting the situation.

While drawing a circle with a single rotating direction, the center should be always on the same side of the velocity vector, i.e. to its right for clockwise rotation and to its left for counter-clockwise rotation. The side only changes if the direction of rotation changes as well. Quick shift in position can lead to failure of the center position estimation, thus inverting the direction of rotation in the reported output. As shown in FIG. 13 (top), two consecutive circles have a large position offset and the second circle can be completed while the estimated center position is still to the left and outside the circle. This may lead to an unintended output angle. In fact, the output angle will actually suggest that there was a circular movement, but in the opposite direction. This situation is expected to occur only in very particular cases as in normal usage the user will tend to rotate around the same point.

Figure 12:
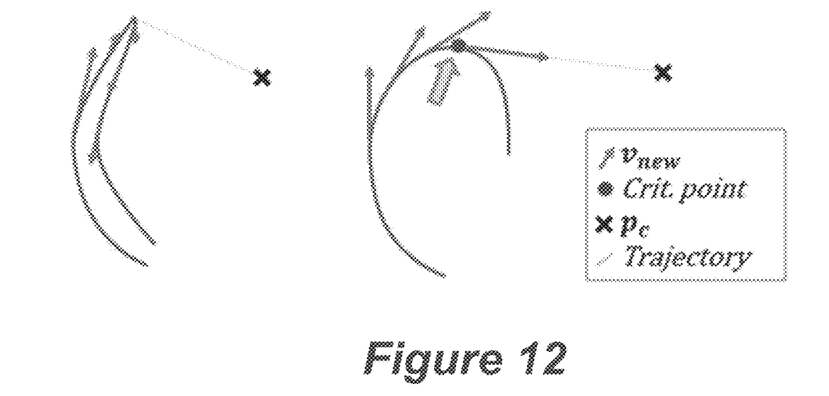
FIG. 12 shows a real direction change on the left side and a detection of a false direction change due to wrong center estimation on the right side.

Direction validation is a feature to prevent inversions of direction due to such fast position shifts. In a real direction change, the movement typically first decelerates and then inverts the rotating direction. For a direction change of the output angle which is caused by erroneous estimation of the center position, the movement typically does hardly decelerate. Hence, each time the center position is in a different side relative to the velocity vector, as shown in FIG. 12, and the velocity did not decrease, erroneous center estimation is detected.

Direction validation assumes erroneous center estimation when the center position changes side relative to the velocity vector, but the velocity has not significantly decreased. In this case the two oldest positions in the extrema buffer are immediately updated, replacing both of them with $p_{new}$, which quickly adjusts the estimated center position back to the correct side of the velocity vector. The point substitution is shown in FIG. 13 (bottom), where, after extremum 8, bottom and left extrema (in the buffer) are replaced by the current position, yielding a new virtual center. The replacement corrects the effect of false direction change that occurred previously in FIG. 13 (top) where the virtual centers 8 and 9 are clearly outside the circle.

Using this approach, the output angle is not smooth, as the center position is changed abruptly, but with filtering, the effects of erroneous center estimation can be successfully mitigated.

Approach B:

The center position is updated when the distance between a new position and the center point is smaller than the distance between a previous position and the center point, i.e. when the circle's radius is decreased in an update step.

Figure 7:
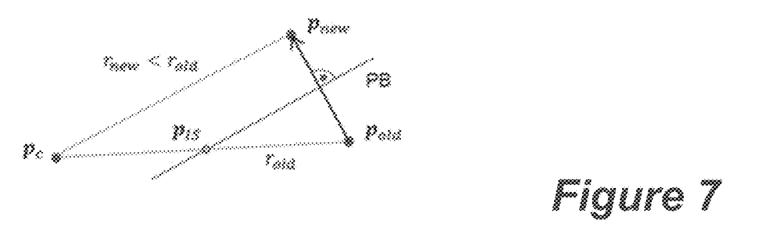
FIG. 7 shows a comparison of center position's distance from old and new input position.

The center position $p_c$ is updated if the radius of the virtual circle is decreased, i.e. if the center position's distance (Euclidean distance) $r_{new}$ to the current input position $p_{new}$ is smaller than its distance $r_{old}$ to the former input position $p_{old}$. This is illustrated in FIG. 7. In the before mentioned case, i.e. if $r_{new}<r_{old}$, the intersection point $p_{IS}$ of the perpendicular bisector PB of the line between current input position $p_{new}$ and previous input position $p_{old}$ with the line through $p_c$ and $p_{old}$ lies between $p_c$ and $p_{old}$. The center point $p_c$ is then updated by moving it towards $p_{IS}$, for example by adding a fraction of ($p_{IS}$−$p_c$) to $p_c$, e.g. by employing a 1st order IIR low-pass filter, i.e.

$$p_c = M \cdot p_c + (1-M) \cdot (p_{IS} - p_c),$$

where M is the IIR filter's memory factor.

Figure 8:
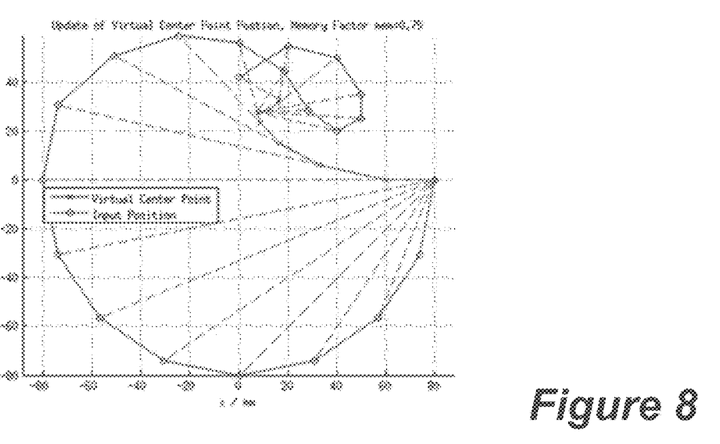
FIG. 8 shows an example for update of the virtual center point position $p_c$.

FIG. 8 illustrates the update of the center position $p_c$ for an example trajectory starting at (x,y)=(80 mm,0).

Start Detection

Output values may be generated between a start and a stop event. A start event may be defined by a circular trajectory and when for example a predefined threshold angle has been exceeded. An angle may be accumulated over multiple measurement points and a start event generated when the threshold has been exceeded.

Other start criteria may apply. Particularly, for 3D touchless sensor systems, the start can be triggered once movement is detected.

The algorithm considers every new input position to compute the absolute angle α and, if it is found to be an extremum, to update the virtual center position $p_c$. Outputs are only reported if the start conditions are met.

To detect a start a minimum rotation angle must be reached and the trajectory must be circular. This rotation angle is a simple accumulation of the angular changes between successive α since the first two input positions, or for a certain amount of time.

Circular trajectory classification uses the circular movement classification (described above) to fill a buffer, preferably a first-in-first-out buffer of limited length. The likelihood that a trajectory is circular is obtained by averaging the classifications stored in the buffer, e.g. with a binary movement classification, it is defined as the number of buffer entries indicating circular movement over the total buffer length. The trajectory is considered as circular if the likelihood is above a predefined threshold.

Additionally, different functionalities can be mapped to the AirWheel depending on the position where the circular movement is started. For example, with a generic 2D touchpad, when starting the movement at the left edge of the touchpad AirWheel can do volume control, and when starting at the right edge AirWheel can control a display's brightness.

Stop Detection

Possible stop detection techniques include the detection of the release of a touch, or the detection of a non-moving finger for a certain amount of time, or the removal of the finger/hand detected by other means than the release of a touch, e.g. hand removal from a 3D sensor system.

A stop can also be detected if the trajectory ceases to be circular, i.e. if the likelihood of a circular trajectory becomes lower than a defined threshold.

Start and/or stop detection can also be triggered by external means, e.g. by pressing/releasing a button of a keyboard.

Listing 1 sketches the resulting algorithm of Approach A with four extrema points.

Listing 1: Update of Center Position Using Approach A

```
status = OFF;                              // Initialization
p_new = [0,0]; p_old = [0,0];              // AirWheel status
v_new = [0,0]; v_old = [0,0];              // Input position vectors
p_c = [0,0];                               // Velocity vectors
                                           // Center position vectors
WHILE true {                               // Update p_new = GetData( );                    // Get new 2-dimensional
    v_new = p_new - p_old;                 //position vector IF <Start Condition Fulfilled> {       // Start/Stop Detection
       status = ON;
    }
    IF <Stop Condition Fulfilled> {
       status = OFF;
    }
```

```
                                           //Update
                                           //Circle Center Position
                                           // Check for local extrema
    i = 0;
    IF v_new [1] < 0 and v_old [1] > 0 → i = 1;     //TOP
    ELSEIF v_new [0] > 0 and v_old [0] < 0 →        //LEFT
    i = 2;
    ELSEIF v_new [1] > 0 and v_old [1] < 0 →        //BOTTOM
    i = 3;
    ELSEIF v_new [0] < 0 and v_old [0] > 0 →        //RIGHT
    i = 4;
    IF i > 0 {
                                           // Push position in the
                                           // Extrema Buffer
       ExtremaBuff[i] = p_old;
                                           // Update center position
       p_c = mean(ExtremaBuff);
    }
                                           // Output
    IF (status == ON) {
       α = atan2(p_new [1] - p_c [1], p_new [0] - p_c [0]);
    }
                                           // Backup latest
                                           // position vector
    p_old = p_new;
    v_old = v_new;
    }
```

Listing 2 Sketches the Resulting Algorithm of Approach B

```
                                           // Initialization
    status = OFF;                          // AirWheel status
    p_new = [0,0]; p_OLD = [0,0];          // Input position vectors
    p_C = [0,0];                           // Center position vectors
    m = 0.75;                              // Memory factor
                                           // for smoothening filter
                                           // Update
    WHILE true {
                                           // Get new 2-dimensional
                                           //position vector
       p_new = GetData( );
                                           // Start/Stop Detection
    IF <Start Condition Fulfilled> {
    status = ON;
    }
    IF <Stop Condition Fulfilled> {
    status = OFF;
    }
                                           // Output
    IF (status == ON) {
       α = atan2(p_new [1] - p_C [1], p_new [0] - p_C [0]);
    }
                                           // Update Circle Center
                                           // Position
    IF ‖p_new - p_C‖ < ‖p_old - p_C‖ {
                                           // Get intersection of
                                           // perpendicular bisector on
                                           // p_old and p_new and the line
                                           // through p_C and p_old
       p_IS = GetIntersection(p_old, p_new, p_c);
                                           // Update center position
       M · p_c + (1 - M) · (p_IS - p_c) ;
    }
                                           // Backup latest position
                                           // vector
    p_old = p_new;
    }
```

Complexity Reduction

In order to reduce computational complexity, when the required angular resolution allows the invers tangent function used to compute the output angle can be approximated for which we propose two methods.

Approximation of the Inverse Tangent Function by Linear Segments

Figure 14:
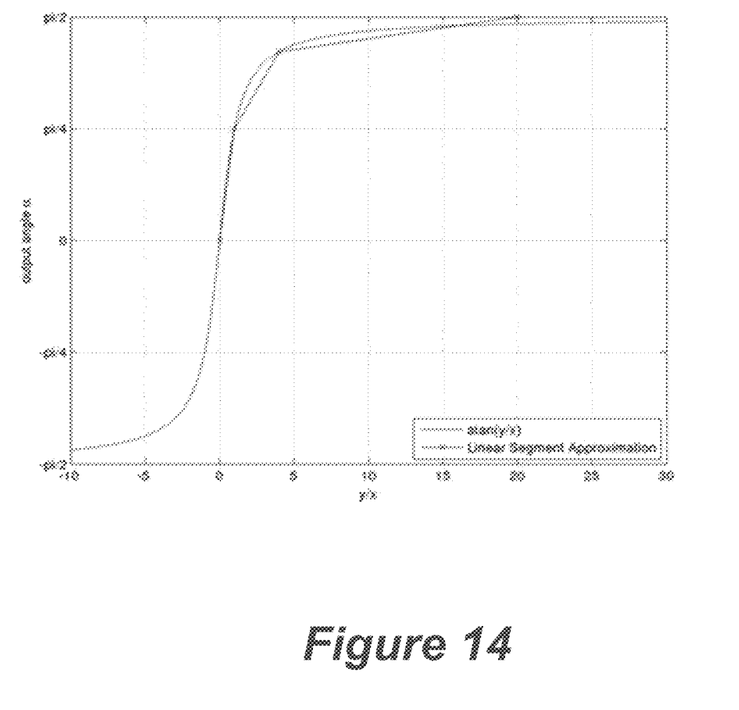
FIG. 14 shows an approximation of invers tangent with linear segments.

The invers tangent function is approximated by linear segments. As the function is pointsymmetric around the origin, it is sufficient to approximate the function for positive values y and x only, i.e. for the first quadrant or quarter circle, and to change the sign of the output angle and/or add multiples of it depending on the signs of y and x. This is illustrated in FIG. 14 where the segment borders are (y/x)∈{0,1,4,20}, leading to a maximum error of π/22 on the output angle.

Segmentation of the Circle

When the requirements for resolution or granularity of the inverse tangent function are even lower, an efficient approach is to segment the quarter-circle and introduce thresholds for the ratio between coordinates (y/x) in order to determine the segment and its associated angle as output value.

The idea is to create a pre-computed lookup table with threshold values of $m_k = \tan(\delta k)$, $\delta_k$ being the angles separating the segments of the quarter-circle. Evaluating the signs of x and y yields the quadrant, and comparing y/x with the stored thresholds $m_k$ yields sub-quadrant precision.

For example, when segmenting a full circle into 16 segments of equal size with the x and y axis representing segment borders, each quadrant contains four segments. The remaining borders within the first quadrant at angles $$\delta_k \in \left\{\frac{\pi}{8}, \frac{\pi}{4}, \frac{3\pi}{8}\right\}$$

correspond to the values $m_k = y/x \in \{0.4142, 1, 2.4142\}$. As these threshold values are rather close to powers of two, they can be approximated by $\tilde{m}_k \in \{0.5, 1, 2\}$, and comparisons of the kind $$\left|\frac{y}{x}\right| < \tilde{m}_k \Leftrightarrow |y| < |x| \cdot \tilde{m}_k$$

can be further simplified by replacing the multiplication with $\tilde{m}_k$ by bit shift operations.

According to other embodiments, given a standard 2D touch pad or equivalent positioning device, an artificial, fix center position could be introduced, e.g. in the touch pad's geometric center, and the estimated/detected finger position could be considered relative to this center position, yielding a unique angle (e.g. to the positive x-axis). A drawback of such an implementation could be that proper functionality is only provided when the selected center position is within the drawn circle. Thus for example a small circle drawn in the upper right corner of the touch pad may not be recognized.

According to various embodiments, the method discussed above can be implemented into a wide variety of devices. For example, the circular gesture may be used to resemble the control of a virtual Volume control wheel of a HiFi set: Clockwise movement increases the volume, counter-clockwise movement decreases the volume.

According to another embodiment, any type of mediaplayer control functionality known from, for example, a circular touchpad can be implemented.

According to yet another embodiment, control of a dimmer in a light switch or various other appliance functions such as, for example, speed control, air condition temperature, mechanical movement functions, etc. can be implemented by the methods disclosed in this application.

According to another embodiment, a replacement for a PC mouse's scroll wheel can be implemented.

The various methods discussed above can be used with a wide variety of sensor systems. Examples for such sensor/measurement systems with two-dimensional sensor are touch panels/touch displays, 2D video cameras, etc. For three-dimensional detection systems, the disclosed methods may be used with 3D video cameras, 3D capacitive sensor systems, etc., where the 3D position is transformed into a 2D position, e.g. by omitting one dimension.

The invention claimed is:

1. A method for detecting a continuous circular gesture performed by an object, the method comprising
    detecting a movement of an object performing a circular movement by scanning the movement and determining subsequent position points of the object, wherein a reference position of a virtual circular movement is determined and adapted depending on fee a history of scanned position points, wherein the reference position is a circle center position and the circle center position is used to determine a current output angle of a circular movement, wherein the circle center position is updated when the distance between a new position point and a current center position is smaller than the distance between a previous position point and the current center position.

2. The method according to claim 1, wherein the subsequent position points are transformed into positions in a two-dimensional plane and extrema of a plurality of subsequent position points are stored in a buffer.

3. The method according to claim 2, wherein the extrema comprise a most left, a most right, a most top and a most bottom position in said two-dimensional plane and wherein said circle center position is determined from said stored extrema.

4. The method according to claim 1, wherein a circular movement is detected by computing an angle between a current velocity vector and a low passed filtered version of the current velocity vector.

5. The method according to claim 1, wherein updating is performed by adding a fraction of a distance between a new circle center position and a current circle center position to the current circle center position.

6. The method according to claim 1, wherein updating is performed by low pass filtering a circle center position change.

7. The method according to claim 1, wherein a current position is buffered in a buffer and wherein the buffer is only updated when a movement is determined to be part of a circular movement and when a velocity vector is higher than a predetermined velocity threshold.

8. The method according to claim 1, wherein a gesture is determined between a start event and a stop event.

9. The method according to claim 8, wherein the start event is defined by a circular trajectory and a predefined threshold angle.

10. The method according to claim 9, wherein a current angle measurement is accumulated over multiple measurements to determine the start event.

11. The method according to claim 8, wherein the stop event is determined when no circular movement is detected for a predetermined time period.

12. The method according to claim 8, wherein the stop event is determined when no movement is detected for a predetermined time period.

13. The method according to claim 1, wherein the object is a finger, a hand, or a pen.

14. The method according to claim 1, wherein scanning the movement and determining subsequent position points of the object is performed by a sensor system generating a quasi-static electric field through a transmission electrode and wherein the sensor system comprises at least two receiving electrodes.

15. A method for detecting a continuous circular gesture performed by an object, the method comprising
detecting a movement of an object performing a circular movement by scanning the movement and determining subsequent position points of the object, wherein a reference position of a virtual circular movement is adapted depending on fee a history of scanned position points, wherein the current output angle is determined using an inverse tangent of (p new−p c), wherein p new is a current position point and p c is a current circle center position.

16. The method according to claim 15, wherein a circular movement is determined by analyzing a segmented movement in each quadrant of a circular movement.

17. The method according to claim 16, further comprising using a look-up table storing pre-computed threshold values for segments of a quarter of a circular movement.

18. A method for detecting a continuous circular gesture performed by an object the method comprising
detecting a movement of an object performing a circular movement by scanning the movement and determining subsequent position points of the object wherein a reference position of a virtual circular movement is determined and adapted depending on a history of scanned position points, wherein the reference position is a circle center position and the circle center position is used to determine a current output angle of a circular movement, wherein the subsequent position points are transformed into positions in a two-dimensional plane and extrema of a plurality of subsequent position points are stored in a buffer wherein the extrema comprise a set of positions on the trajectory wherein, for each comprised position p, there are two associated velocity vectors, the current velocity vector, starting at p, and the previous velocity vector, ending at p; and an angle of one of the said vectors is greater than or equal to a defined angle where an angle of the other said vector is less than the defined angle, or an angle of one of the said vectors is greater than a defined angle where an angle of the other said vector is less than or equal to the defined angle; and wherein said circle center position is determined from said stored extrema.

19. The method according to claim 18, wherein a circular movement is detected by computing an angle between a current velocity vector and a low passed filtered version of the current velocity vector.

20. A method for detecting a continuous circular gesture performed by an object, the method comprising:
detecting a movement of an object performing a circular movement by scanning the movement and determining subsequent position points of the object,
detecting a decrease of a radius of a circular movement, wherein the decrease of the radius is detected when a sector line of a velocity vector between two successive position points intersects with a line through a center point and an older position point of the two successive position points;
updating a center point when a decrease of the radius has been detected.

21. The method according to claim 20, wherein updating is performed by adding a fraction of a distance between an intersection point and the center point to the center point.

22. The method according to claim 20, wherein updating is performed by low pass filtering a center point change.

23. The method according to claim 20, wherein the sector line is a perpendicular bisector of the line between new and old position.

24. The method according to claim 20, wherein the sector line has an angle unequal 90 degrees with respect to the velocity vector.

25. The method according to claim 24, wherein two different lines are considered, for clockwise and counter-clockwise movement.

26. The method according to claim 20, further comprising outputting an angle of a position point relative to the reference position of the virtual circular movement.

* * * * *

UNITED STATES PATENT AND TRADEMARK OFFICE
CERTIFICATE OF CORRECTION

PATENT NO. : 9,971,442 B2  
APPLICATION NO. : 14/924329  
DATED : May 15, 2018  
INVENTOR(S) : Axel Heim et al.

Page 1 of 1

It is certified that error appears in the above-identified patent and that said Letters Patent is hereby corrected as shown below:

In the Claims

Column 12,  
Claim 1, Line 20, "...determined and adapted depending on fee a history of..."  
---Change to--- "...determined and adapted depending on the history of..."

Column 13,  
Claim 15, Line 15, "...adapted depending on fee a history of scanned position..."  
---Change to--- "...adapted depending on a history of scanned position..."

Signed and Sealed this  
Second Day of October, 2018

Andrei Iancu  
*Director of the United States Patent and Trademark Office*